United States Patent Office 3,470,379
Patented Sept. 30, 1969

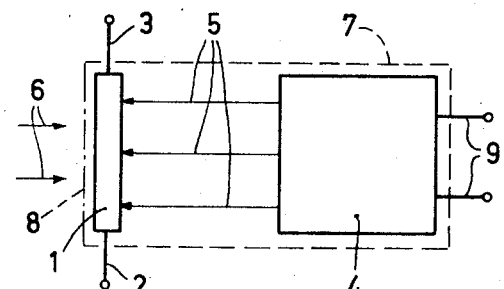
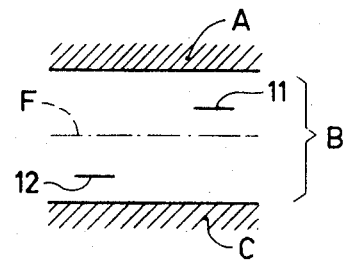
FIG.1   FIG.2
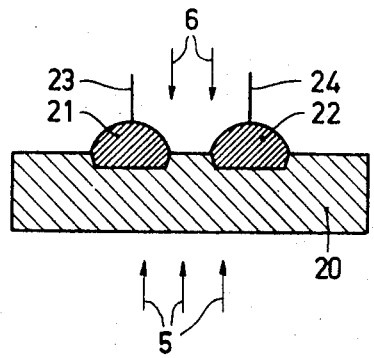
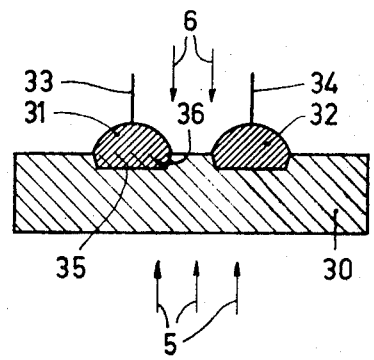
FIG.4   FIG.5
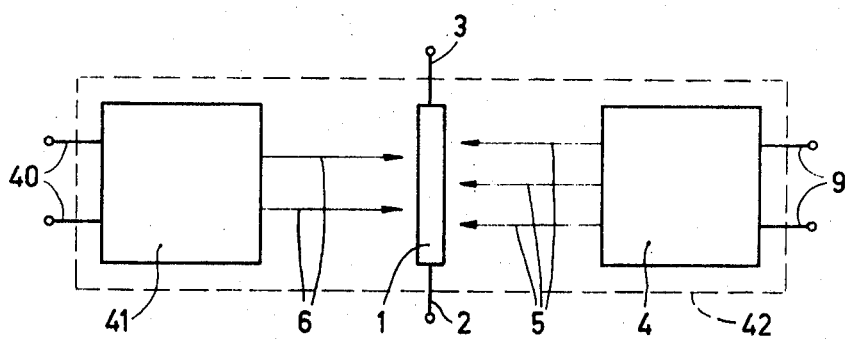
FIG.6

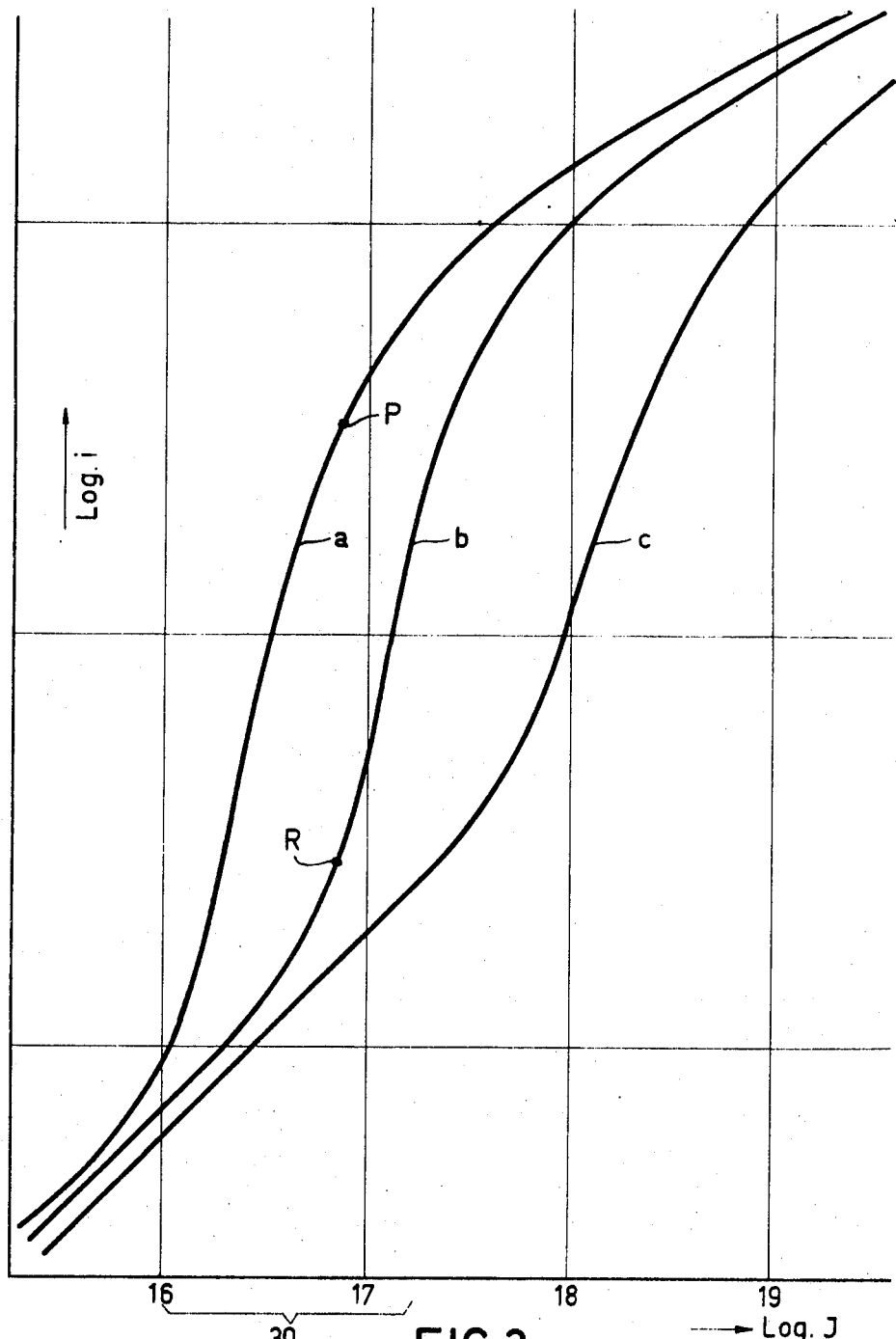

3,470,379
DEVICE FOR DETECTING RADIATION
Hermann Georg Grimmeiss and Heinz Scholz, Aachen, Germany, assignors, by mesne assignments, to U.S. Philips Corporation, New York, N.Y., a corporation of Delaware
Filed Oct. 14, 1965, Ser. No. 495,854
Claims priority, application Netherlands, Oct. 15, 1964, 6411983
Int. Cl. H01j 39/12
U.S. Cl. 250—211                                              14 Claims

ABSTRACT OF THE DISCLOSURE

A semiconductor device is provided for detecting long-wave radiation in which the separation between the valence and conduction bands exceeds the quantum energy of the radiation to be detected and in which impurities are incorporated in the semiconductor establishing capture centers for both free electrons and free holes. The sensitivity of the device is increased by subjecting the device to auxiliary radiation capable of generating therein free electrons and free holes in which the quantum energy of the auxiliary radiation is at least equal to the forbidden band width of the semiconductor.

---

This invention relates to devices for detecting radiation and more particularly long-wave radiation, such as red and infrared radiation, comprising a photosensitive semiconductor body to which the radiation to be detected is supplied.

The semiconductor body in such a device may serve as a photosensitive resistance element and be provided with two connecting contacts between which an electrical voltage is maintained, the radiation to be detected being measured by means of the photocurrent produced in the semiconductor body by the said radiation.

Another possibility is that the photosensitive semiconductor body has a p-n junction and that the radiation to be detected can reach the vicinity of the p-n junction causing a photoelectric current which may be measured in an external electrical connection between the p-type and n-type areas of the semiconductor body. The p-n junction may in this case be biased in the reverse direction by means of a voltage source.

The photo current produced by the radiation to be detected may occur due to this radiation generating free charge carriers, electrons and/or holes, in the semiconductor body.

The radiation to be detected may produce, for example, free electrons and holes by bringing electrons from the valence band into the conduction band of the photosensitive semiconductor body. The forbidden band of the photosensitive semiconductor body must then have a width which is equal to, or smaller than, the quantum energy of the radiation to be detected. For detection of long-wave radiation, for example, infra-red or red radiation, having a small quantum energy, the semiconductor body thus might have a forbidden band of small width so that the dark current is comparatively large, which has an unfavourable influence on the sensitivity to the detection of radiation.

The disadvantages relating to a large dark current which are involved when using a semiconductor body having a forbidden band of a small width may be avoided or limited by using a semiconductor body having a forbidden band of a width larger than corresponds to the quantum energy of the radiation to be detected and which has an energy level located deep in the forbidden band by incorporation of an impurity. Electrons may then be moved from the valence band to the conduction band in two stages via the energy level located in the forbidden band. The width of the forbidden band may then lie between one and two times the quantum energy of the radiation to be detected. However, this involves the disadvantage that the sensitivity of the device is limited due to two radiation quanta of the radiation to be detected instead of one being necessary for each pair of electron-holes to be created, namely one radiation quantum for each of the two stages. Furthermore it is often comparatively inefficient to generate pairs of electron-holes through an intermediate level, more particularly when detecting monochromatic radiation, since the two transition stages usually have different sizes so that the radiation to be detected may at most be matched satisfactorily to one transition stage.

An object of the invention is inter alia to provide a device for detecting radiation, more particularly long-wave radiation such as red and infra-red radiation, which does not have the aforementioned disadvantages of known devices or at least to a much lesser extent and which has a very high sensitivity.

The invention is based inter alia upon recognition of the fact that a photoelectric current produced in a photosensitive semiconductor body by radiation producing free electrons and holes may abruptly increase, with increasing intensity of the said radiation, in superlinear relationship to the intensity thereof by incorporating capture centres capturing free electrons and capture centres capturing free holes (often referred to as "killers" for electrons and "killers" for holes) in the semiconductor body and that, when the intensity of the radiation producing free charge carriers is adjusted to a value located in the range of intensities in which the said superlinear increase occurs, the magnitude of the photoelectric current must be highly sensitive to further radiation which may act upon the capture of free charge carriers by the capture centre since the range of intensities in which the superlinear increase occurs will be shifted to higher or smaller intensities by the said further radiation, while as a result of the said superlinear increase, a very small displacement already suffices to bring about a great variation in the photoelectric current.

A device for detecting radiation in accordance with the invention which comprises a photosensitive semiconductor body to which the radiation to be detected is supplied is therefore characterized in that auxiliary radiation is supplied to the photosensitive semiconductor body so that free charge carriers, both electrons and holes, are produced in the semiconductor body, that the semiconductor body has, at least locally, capture centres which cause at least one energy level in the forbidden band of the semiconductor body into which level electrons may be captured and at least one energy level into which holes may be captured which capture centres with increasing intensity of this auxiliary radiation cause a superlinear increase of the photocurrent in relationship to the intensity of the auxiliary radiation over a range of intensities thereof, that the intensity of the auxiliary radiation is adjusted to a value located in the said range of intensities, and that the radiation to be detected comprises, at least in part, radiation which can act upon the capture of free charge carriers by the capture centres and which has a quantum energy smaller than corresponds to the width of the forbidden band in the photosensitive semiconductor body. A device according to the invention thus makes possible a method of detecting radiation in a very sensitive manner in which a small dark current occurs.

In this connection it should be noted that the term "superlinear increase of the photocurrent in relationship to the intensity of the auxiliary radiation" is to be understood herein to mean an increase of the photocurrent in relationship to the intensity of the auxiliary radiation which is sharper than quadratic.

Several mechanisms are conceivable for obtaining aforementioned superlinear increase in photocurrent in relationship to the intensity of the auxiliary radiation in a photosensitive semiconductor body by means of capture centres and their associated energy levels. However, an important and simple preferred embodiment of a device according to the invention is characterized in that the energy level capturing electrons lies above the Fermi-level and the energy level capturing holes lies below the Fermi-level, the capture centres being present in concentrations at which, with increasing intensity of the auxiliary radiation, the photoelectric current produced by this auxiliary radiation is initially limited by the capture of generated charge carriers into the said levels and, subsequently, increases in superlinear relationship to the intensity of the auxiliary radiation due to the population with captured charge carriers of at least one of the said levels commencing to reach its maximum.

It should be noted that it is not necessary that the Fermi-level lies between the energy level capturing electrons and the energy level capturing holes. The Fermi-level may be located either slightly above the energy level capturing electrons in which event this energy level is already partly populated with electrons, or slightly below the energy level capturing holes in which event this level is already partly populated with holes. However, optimum results, inter alia a very steep superlinear variation of the photo current in relationship to the intensity of the auxiliary radiation, are obtained if the Fermi-level lies between the energy level capturing electrons and the energy level capturing holes.

It will be evident that by control of the ratio between the concentrations of the capture centres, that is to say control of their product of concentration of the capture centre multiplied by its capture, cross-section for the charge carriers to be captured it is in many cases possible to ensure that at will either the one or the other energy level reaches first its maximum population with captured charge carriers, while the intensity of the auxiliary radiation at which the superlinear increase in photo current begins, depends upon the magnitude of these concentrations.

Capture centres which may capture free electrons and/ or holes are known for substantially any semiconductor and are often referred to as "killers" (for electrons or holes). They may consist of either impurities or lattice faults.

As is well-known, the location of the Fermi-level in a semiconductor may be adjusted by control of the concentrations of impurities, donors and acceptors and/or capture centres. A capture centre may behave as a donor or acceptor having a donor or acceptor level located at great depth, and hence as a donor or acceptor which is not ionized completely.

If the radiation to be detected can bring electrons from or to an energy level associated with a capture centre, this radiation may thus act upon the capture of charge carriers by the capture centre.

A group of important embodiments of a device for detecting radiation in accordance with the invention is characterized in that the capture centres are present in concentrations at which with increasing intensity of the auxiliary radiation the photo current increases in superlinear relationship to the intensity of the auxiliary radiation due to the population with captured electrons of the energy level into which electrons are captured commencing to reach its maximum.

It is thus possible in a very sensitive manner to detect radiation consisting, at least in part, of radiation which can move electrons from the valence band to the energy level capturing holes, thus reducing the photo current produced by the auxiliary radiation.

It is to be noted that photo-conductive materials are known per se in which a photo current may be produced by incident radiation, which photo current may be reduced with the aid of another incident radiation. This effect is usually referred to as "quenching" in literature. The sensitivity to the radiation reducing the photo current of these known materials is smaller, however, than in a device according to the invention and furthermore, in known methods, the photo current decreases in favourable cases only to approximately 10% of its initial value whereas in a device according to the invention reductions have been obtained such that the decreased photo current still was only a factor of $10^{-5}$ times its initial value.

Further it is possible in favourable manner to detect radiation consisting, at least in part, of radiation which can move electrons from the energy level capturing electrons to the conduction band, thus increasing the photo current produced by the auxiliary radiation.

The said decrease and increase in photo current will be described more fully hereinafter.

A further important group of embodiments of a device for detecting radiation in accordance with the invention is characterized in that the capture centres are present in concentrations at which with increasing intensity of the auxiliary radiation the photo-electric current increases in superlinear relationship to the intensity of the auxiliary radiation due to the population with holes of the energy level capturing holes commencing to reach a maximum.

It is thus possible in a very sensitive manner to detect radiation consisting at least in part of radiation which can bring electrons from the energy level capturing electrons to the conduction band thus decreasing the photo current produced by the auxiliary radiation and/or to detect radiation consisting, at least in part, of radiation which can bring electrons from the valence band to the energy level capturing holes thus increasing the photo current produced by the auxiliary radiation.

The photosensitive semiconductor body may advantageously have a p-n junction so that it can act itself as a current and/or voltage source.

It has been found that, in the presence of a p-n junction, it suffices that only in the vicinity of the p-n junction the Fermi-level lies between the energy level capturing electrons and the energy level capturing holes. This means that only a region which is adjacent the p-n junction needs to be high-ohmic. In fact, the location of the Fermi-level between the levels caused by the capture centre usually means in practice that semiconductor material is high-ohmic.

In embodiments in which the said superlinear increase occurs due to the energy level capturing electrons commencing to reach its maximum population and in which the photosensitive semiconductor body has a p-n junction, favourable results are obtained if the device is characterized in that the capture centres are present in the p-type part adjacent to the p-n junction of the photosensitive semiconductor body, auxiliary radiation and radiation to be detected being supplied to this p-type part.

Very sensitive detection of radiation is obtained with a photosensitive semiconductor body of gallium phosphide which is found to have already capture centres capturing electrons merely because of its manufacture and in which capture centres capturing holes are obtained by doping with copper impurities.

In embodiments in which the said superlinear increase occurs due to the energy level capturing holes commencing to reach its maximum population and in which the photosensitive semiconductor body has a p-n junction, favourable results are obtained if the device is characterized in that the capture centres are present at least in the n-type portion adjacent to the p-n junction of the photosensitive semiconductor body, auxiliary radiation and radiation to be detected being directed to this n-type part.

When a photosensitive semiconductor body having a p-n junction, the photo current produced by the auxiliary radiation is likewise reduced or intensified by the radiation to be detected.

It is to be noted that, although "quenching" of a photoelectric current in a photosensitive resistance element by incident radiation is known per se from literature, quenching of a photoelectric current produced in a photosensitive semiconductor body having a p-n junction has not been described so far.

A device for detecting radiation in accordance with the invention preferably includes an auxiliary radiation source optically coupled to the photosensitive semiconductor body, which source can supply auxiliary radiation to the photosensitive semiconductor body and constitutes a structural combination therewith.

It is to be noted that a device for detecting radiation is to be understood herein to mean not only a device suitable for detecting radiation as such but also, for example, a device in which radiation to be detected is emitted by a radiation source associated with the device itself and which device is used, for example, as an optoelectronic switching element having two electrical inputs connected to the radiation sources and an electrical output connected to the photosensitive semiconductor body. One important embodiment of a device for detecting radiation in accordance with the invention is therefore characterized in that a second radiation source optically coupled to the photosensitive semiconductor body is provided which second source can supply radiation to be detected to the photosensitive semiconductor body and which constitutes a structural combination with the auxiliary radiation source and the photosensitive semiconductor body.

In order that the invention may be readily carried into effect, it will now be described in detail, by way of example, with reference to the accompanying diagrammatic drawings in which:

FIGURE 1 shows one embodiment of a device for detecting radiation in accordance with the invention;

FIGURE 2 shows an example of an energy level diagram of a semiconductor body for use in a device in accordance with the invention;

FIGURE 3 shows curves illustrating the dependence of the photo current upon the intensity of the incident radiation in a device according to the invention;

FIGURES 4 and 5 show digrammatically and in cross-section photosensitive semiconductor bodies provided with electrodes as used in a device according to the invention, and FIGURE 6 shows another embodiment of a device according to the invention.

Referring now to FIGURE 1, this figure shows a device for detecting radiation 6 comprising a photosensitive semiconductor body 1 to which the radiation 6 to be detected is supplied. The photosensitive semiconductor body 1 has connecting contacts 2 and 3 to which a measuring instrument (not shown) for measuring the photo current is connected and to which a voltage source for applying a biasing potential to the contacts 2 and 3 may also be connected if this is necessary (as in the case that the photosensitive semiconductor body is a photo resistance-element) or desirable.

According to the invention, auxiliary radiation 5 emitted by an auxiliary radiation source 4 is supplied to the photosensitive semiconductor body 1 so that free charge carriers, both electrons and holes, are generated in the semiconductor body 1. To this end, the auxiliary radiation 5 has, for example, a quantum energy at least equal to the width of the forbidden band of the semiconductor body 1. The semiconductor body 1 also has capture centres causing at least one energy level 11 (see FIGURE 2) in the forbidden band B of the semiconductor body 1 into which electrons may be captured and at least one energy level 12 into which holes may be captured. The capture centres cause a superlinear increase in the photo current $i$ in relationship to the intensity I of the auxiliary radiation 5 with increasing intensity I of the auxiliary radiation 5 (see curve $a$ in FIGURE 3) over a range of intensities of the auxiliary radiation 5 (approximately the region 30 in FIGURE 3). In a device according to the invention the intensity I of the auxiliary radiation 5 is adjusted to a value located in the region 30, while radiation 6 is detected which consists, at least in part, of radiation which can influence the capture of free charge carriers into the energy levels 11 and 12 and which has a quantum energy smaller than corresponds to the width of the forbidden band B.

It is to be noted that curve $a$ of FIGURE 3 is of the kind such as obtained in a device in accordance with the invention by logarithmically plotting the intensity I of the auxiliary radiation against the photo current $i$ occurring at this intensity. The superlinear portion of curve $a$ lies approximately in the region 30 of intensities I.

In important and simple preferred embodiments of devices according to the invention the electron-capturing energy level 11 lies above the Fermi-level F and the hole-capturing energy level 12 lies below the Fermi-level F, and the capture centres are present in concentrations at which, with increasing intensity I of the auxiliary radiation 5, the photo current $i$ produced in the photosensitive semiconductor body is initially limited by the capture of generated electrons and holes into the levels 11 and 12 and then increases in superlinear relationship to the intensity I of the auxiliary radiation 5 due to the population with captured charge carriers of at least one of the levels 11 and 12 commencing to reach its maximum.

The location of the Fermi-level may be adjusted in a manner known per se by controlling the concentrations of donors and/or acceptors. These are usually impurities which are ionized almost completely and which cause energy levels (not shown in FIGURE 2) located very close to the conduction band or the valence band. The capture centres which may capture electrons or holes and which cause energy levels located deeper in the forbidden band, such as the levels 11 and 12, may also influence the location of the Fermi-level. In fact, capture centre may behave as a donor or acceptor which is not ionized completely and has a donor or acceptor level located deep in the forbidden band.

It is to be noted that the location of the Fermi-level is to be understood herein to mean the location of this level in the photosensitive semiconductor body if it absorbs no radiation or substantially no radiation. The location of the Fermi-level may be shifted, for example, during irradiation with the auxiliary radiation whereby the population with captured charge carriers of the levels 11 and 12 in FIGURE 3 increases.

The capture of charge carriers by a capture centre, depends inter alia upon the product of the concentration of a capture centre that is to say the number of impurity atoms or lattice faults forming capture centres incorporated per unit volume in the body, and their capture cross-section for charge carriers to be captured per impurity centre or lattice fault.

By control of the ratio between the concentrations of the capture centres causing the levels 11 and 12 (FIGURE 2) it is thus possible to ensure that either the level 11 or the level 12 is the first to reach its maximum population with increasing intensity of the auxiliary radiation 5 (FIGURE 1) while the magnitude of these concentrations determines the intensity of the auxiliary radiation 5 at which the superlinear increase in photoelectric current begins.

Capture centres capturing electrons and capturing holes are known for a great many semiconductors and one skilled in the art can obtain by experiment a characteristic for the relevant semiconductor body of the kind shown in FIGURE 3 by controlling the concentrations of the interference centres.

With a first important group of embodiments of devices according to the invention which will now be described the capture centres are present in the photosensitive semiconductor body 1 in concentrations at which the photo current $i$ increases in superlinear relationship to the intensity of the auxiliary radiation 5, with increasing intensity I of this radiation 5, due to the population with captured electrons of the electron-capturing energy level 11 commencing to reach its maximum.

It is thus possible in a very sensitive manner to detect radiation 6 which consists at least in part, of radiation which can bring electrons from the valence band C to the holes-capturing energy level 12, and hence radiation having a quantum energy which is greater than the gap between the level 12 and the valence band C.

This may probably be explained as follows:

When auxiliary radiation 5 is supplied to the photosensitive semiconductor body 1 electrons are moved from the valence band C to the conduction band A, and hence free electrons and free holes are produced in the conduction band A and the valence band C respectively. The photo current $i$ initially remains limited due to the electrons being captured into the energy level 11 and the holes being captured into the energy level 12. A slight recombination of electrons with holes through the levels 11 and 12 will also occur.

If the intensity I of the auxiliary radiation 5 increases the level 11 commences to reach its maximum population with captured electrons. This means that the level 11 can no longer capture all of the electrons generated so that the life of the free electrons greatly increases and hence the number of free electrons. The photo current resulting from generated free electrons thus commences to increase superlinearly in relationship to the intensity I of the auxiliary radiation 5.

If the photo current $i$, before the level 11 reaches its maximum population, is photo-electric current which results substantially from generated free electrons the photo-electric current $i$ thus will increase superlinearly. If the photo-electric current $i$, before the level 11 reaches its maximum population, is a photo-electric current which results substantially from generated free holes the photo-electric current $i$ will increase superlinearly only if the increasing photo-electric current caused by free electrons commences to dominate the photo-electric current caused by holes.

If the intensities I of the auxiliary radiation 5 increase still further the level 11 has substantially no influence any more and the photo-electric current $i$ again increases at a much lower rate with increasing intensity I of the auxiliary radiation 5.

An example of the variation of the photo-electric current $i$ as a function of the intensity I of the auxiliary radiation is shown by curve $a$ in FIG. 3.

If the photosensitive semiconductor body is irradiated with radiation 6 of constant intensity, which radiation can bring electrons from the valence band C to the hole-capturing energy level 12, and if the photo current $i$ is plotted logarithmically against the intensity I of the auxiliary radiation 5, then a curve located to the right of curve $a$ is obtained, for example, curve $b$ of FIG. 3. Due to the radiation 6, the superlinear increase in the photo-electric current $i$ in relationship to the intensity I of the auxiliary radiation 5 is thus shifted to a region of greater intensities I. Curve $c$ is obtained, for example, if the intensity of the radiation 6 is increased.

This can be understood as follows: Since the radiation 6 brings electrons from the valence band C to the hole-capturing level 12 the concentration of holes in the valence band C is increased. An electron captured into the electron-capturing level 11 can thus recombine more rapidly with a hole in the valence band C so that the time during which captured electrons remain in the level 11 is as it were shortened. This means that a larger number of electrons must be captured to reach the maximum population with electrons of the level 11 and hence that the maximum population of the level 11 will occur only at greater intensities of the auxiliary radiation 5.

Since due to the radiation 6 to be detected, if this radiation can increase the population with electrons of the level 12, the superlinear increase in the photo-electric current is shifted to a region of greater intensities of the auxiliary radiation 5, very sensitive detection of the radiation 6 is possible.

When the device of FIGURE 1 is adjusted to point P of curve $a$ in which event no radiation 6 to be detected impinges on the photosensitive semiconductor body 1, then upon detection of radiation 6 having an intensity at which curve $b$ is obtained, the device of FIGURE 1 will adjust itself to point R of curve $b$ since the intensity of the auxiliary radiation 5 is not changed at all. Due to the superlinear form of the curves $a$ and $b$ a considerable variation in the magnitude of the photo-electric current $i$ occurs. This superlinear variation also permits of detecting very small signals consisting of radiation 6.

If the level 11 is in practice insensitive in optical respect, that is to say, if substantially no electrons can be brought from the level 11 to the valence band A due to radiation, it is possible in the described manner to detect radiation having a quantum energy which is at least equal to the gap between the level 12 and the valence band C and smaller than the width of the forbidden band B.

It is to be noted that capture centres which are insensitive in optical respect are known as non-radiating centres in literature.

If, however, the level 11 is optically sensitive, it is only possible to detect in the described manner radiation having a quantum energy which is smaller than the gap between the level 11 and the conduction band A, and thus in this case only radiation can be detected in the described manner if the gap between the level 11 and the conduction band A is larger than the gap between the level 12 and the valence band C.

If the level 11 is optically sensitive it is possible to detect radiation 6 which can bring electrons from the level 11 to the conduction band. The level 12 may then be optically insensitive or be located farther from the valence band C than the level 11 lies from the conduction band A.

The radiation 6 to be detected then decreases as it were the effective concentration of the capture centre causing the level 11 so that the level 11 will reach its maximum population already at comparatively small intensities I of the auxiliary radiation 5. With constant irradiation with radiation 6 a curve located to the left instead of to the right of curve $a$ is obtained and upon detection of the radiation 6 an increase instead of a decrease in the photo current $i$ is obtained.

In a further important group of embodiments of a device according to the invention the capture centres are present in concentrations at which the photo current increases in superlinear relationship to the intensity of the auxiliary radiation 5, with increasing intensity thereof, due to the population with holes of the hole-capturing level 12 commencing to reach its maximum. Similarly, as has been described in the previous case, it is possible in very sensitive manner to detect radiation 6 consisting, at least in part, of radiation which can bring electrons from the electron-capturing level 11 to the conduction band A, thus decreasing the photo-electric current produced by the auxiliary radiation 5. Further it is possible to detect radiation 6 consisting, at least in part, of radiation which can bring electrons from the valence band C to the hole-capturing level 12, thus increasing the photo-electric current produced by the auxiliary radiation 5.

It is to be noted that, in these last embodiments, the photo-electric current caused by generated holes increases superlinearly. If the photo-electric current $i$, before the level 12 is reaching its maximum population, is caused substantially by generated holes, the photoelectric current $i$ will increase superlinearly. If the photo-electric current, before the level 12 is reaching its maximum population, is caused substantially by generated electrons, the photo-electric current $i$ will increase superlinearly if the increasing photo-electric current caused by generated holes commences to dominate the photo-electric current caused by electrons.

The photosensitive semiconductor body preferably has a p-n junction through which a photo-electric current may be produced in the photosensitive semiconductor body without applying a bias potential. The charge carriers generated in the vicinity in the p-n junction, that is to say the minority charge carriers generated within a distance at most equal to a few diffusion lengths from the p-n junction, add to the photo-electric current occurring in a semiconductor body having a p-n junction. In fact, the photo-electric current results from minority charge carriers diffusing through the p-n junction. In a device according to the invention it therefore suffices that the electron-capturing level 11 lies above the Fermi-level F and the hole-capturing level 12 lies below the Fermi-level F only in the vicinity of the p-n junction. This is preferably also the case since the location of the Fermi-level F between the levels 11 and 12 usually means that the relevant semiconductor material is high-ohmic. This is favourable with a photo-electric resistance element since it means a high dark resistance; if the semiconductor body has a p-n junction the dark resistance is determined, however, by the p-n junction and it is then more favourable if the semiconductor body is high-ohmic only in the vicinity of the p-n junction and low-ohmic at a comparatively large distance from the p-n junction, the Fermi-level F being located either above the level 11 or below the level 12 since it makes possible a lower internal resistance of the semiconductor body.

In cases where the photosensitive semiconductor body 1 is a photo-sensitive resistance element and where this semiconductor body has a p-n junction, characteristics of the same kind are obtained. These characteristics are shown in FIGURE 3. Further it is possible in either case to detect radiation decreasing the photo current and radiation increasing the photo current. In the case of a photosensitive resistance element the photo current results from generated charge carriers which move under the action of a voltage applied to the element whereas in the case of a semiconductor body having a p-n junction the photo-electric current results from generated minority charge carriers diffusing through the p-n junction. Since the generated minority charge carriers are especially important in a semiconductor body having a p-n junction, in embodiments of a device according to the invention in which the superlinear increase in photo-electric current may occur due to the electron-capturing level 11 reaching its maximum population and in which the semiconductor body has a p-n junction, the capture centres are preferably present at least in the p-type part adjacent the p-n junction of the photosensitive semiconductor body auxiliary radiation and radiation to be detected being supplied to the said p-type part.

If the superlinear increase occurs due to the level 12 reaching its maximum population, the capture centres are preferably present at least in the n-type part adjacent the p-n junction, auxiliary radiation and radiation to be detected being supplied to this n-type part.

Several embodiments will now be described more concretely.

A photosensitive semiconductor body of gallium phosphide may be used which is obtained as follows:

Initially an n-type gallium phosphide body is manufactured by leading phosphoric hydrogen over an amount of gallium present in a vessel of aluminum oxide at a temperature of approximately 1,200° C. The leading-over process lasts until gallium phosphide plates have been formed in the gallium. After cooling, these plates may be removed from the gallium, for example, by mechanical means, whereafter gallium residues may be removed from the plates by means of hydrochloric acid (approximately 30% by weight). The phosphoric hydrogen which is led over may be obtained by reacting aluminum phosphide with water and drying the resulting phosphoric hydrogen.

The gallium phosphide plates obtained have dimensions of approximately 3 mm. x 3 mm. x 0.25 mm. The plates are found to have n-type conductivity.

Subsequently, the gallium phosphide plates are activated with copper and to this end, they are heated in contact with well-cleaned copper, for example, lengths of copper wire laid on the plates, in a quartz tube. Preferably to remove impurities, a first heat treatment is carried out in vacuo temperature between 200° C. and 300° C. for a few hours. Thereafter a heat treatment is carried out in air at a pressure of approximately 0.5 mm. Hg at approximately 400° C. for a few hours, for example 5 hours. The surfaces of the plates then acquire a black color due to adsorption of copper.

After removal of the lengths of copper, the plates are heated again and this heating process takes place in vacuo in a closed quartz tube (approximately $10^{-6}$ mm. Hg) for approximately 24 hours at approximately 900° C. The black discolouration then disappears due to the absorbed copper being distributed in the plates.

Either n-type or p-type plates may be obtained as a function of the concentration of donors in the intital material and the absorbed amount of copper.

Plates of weak n-type conduction and having a resistivity of approximately $10^9$ ohm cm. are obtained in the manner described.

Two tin contacts 21 and 22 are alloyed on such a plate 20 (see FIGURE 4) at a temperature between 500° C. and 800° C. for approximately 1 second. The tin contacts are spaced apart approximately 1 mm. and have a diameter of approximately 0.5 mm. The tin contacts are provided in the usual manner with supply conductors 23 and 24.

The contacts 21 and 22 form a substantially ohmic connection with the gallium phosphide body 20.

The resulting assembly may be used as photosensitive resistance element in a device according to the invention.

The gallium phosphide body 20 has an energy level diagram as shown in FIGURE 2. The forbidden band B has a width of approximately 2.25 ev. The electron-capturing level 11 is found to be present in the crystals manufactured in the manner described. The hole-capturing level 12 is probably caused by the activation with copper.

If a voltage of a few volts, for example approximately 5 volts, is applied between the contacts 21 and 22 a characteristic similar to curve $a$ of FIGURE 3 is obtained upon irradiation with auxiliary radiation 5. The curve $a$ is obtained by irradiation with auxiliary radiation 5 having a wavelength of approximately 4950 A.

The intensity I of the auxiliary radiation 5 is plotted logarithmically (to the base 10) and in the number of radiation quanta per cub. cm. and per sec. of the incident auxiliary radiation 5. The photo-electric current $i$ is plotted logarithmically (to the base 10) and in arbitrary units.

If, in addition to auxiliary radiation 5, the device is irradiated with red or infra-red radiation having a quantum energy between approximately 0.6 ev. and 2.0 ev., a curve located to the right of curve $a$ is obtained. Curve $b$ is obtained by irradiating, in addition to auxiliary radiation 5, with infra-red radiation having a wavelength of approximately 1μ. Curve c is obtained at an intensity of the infra-red radiation which is approximately 20 times greater. This means, as appears from the foregoing explanation with reference to FIGURE 3, that the superlinear increase of the photo-electric current i in relationship to the intensity I of the auxiliary radiation 5 occurs due to the level 11 reaching its maximum population, and that the red or infra-red radiation can move electrons from the valence band C to the level 12 wich is located at a distance of approximately 0.75 ev. from the valence band C.

By means of the photosensitive element of FIGURE 4 it is thus possible to detect red or infra-red radiation 6 having a quantum energy located between approximately 0.6 ev. and 2.0 ev., the photo-electric current produced by the auxiliary radiation 5 being decreased. With infra-red radiation having a wavelength of approximately 1μ the photo current can be decreased, for example, by a factor of $10^{-5}$. Further it has readily been possible to detect incident radiation energies from $10^{-7}$ watt to $10^{-3}$ watt.

Now the use of a semiconductor body having a p–n junction will be described.

It is likewise possible to use a gallium phoshide body which may be manufactured in a similar manner as has been described in the previous example, except that by lengthening slightly the process of heating the gallium phosphide plate in contact with copper, the plate becomes p-type conductive and has a resistivity located between approximately 10 ohm cm. and 1000 ohm cm. Two contacts are alloyed on such a gallium phosphide plate 30 (FIGURE 5), namely a rectifying contact 31 of tin and a substantially ohmic contact 32 of gold to which approximately 4% by weight of zinc have been added.

Both contacts 31 and 32 may be alloyed in the same manner and have the same dimensions as the contacts 21 and 22 (FIGURE 4) in the previous example.

The contact 31 constitutes a p–n junction 35 with the p-type gallium phosphide plate 30.

The contacts 31 and 32 may be provided in the usual manner with supply conductors 33 and 34.

The gallium phosphide plate 30 has the same levels 11 and 12 as has the gallium phosphide plate 20. However, the Fermi-level F will be situated between the levels 11 and 12 only in a region of the gallium phosphide plate 30 which is adjacent the p–n junction 35 since the Fermi-level lies at the centre of the forbidden band B at the plane of the p–n junction 35 and lies below the level 12 at some distance from the p–n junction 35 since the plate 30 has p-type conductivity.

The life of the free electrons produced by the auxiliary radiation 5 may thus increase in a region of the p-type plate 30 which is adjacent the p–n junction 35 due to the electron-capturing level 11 reaching its maximum population. The photo current thus increases superlinearly since in a semiconductor body having a p–n junction the photo current is caused by the minority charge carriers.

By means of a plate 30 having the contacts 31 and 32 similar characteristics to those shown in FIGURE 3 have actually been obtained and when using a plate 30 having the contacts 31 and 32 it is possible to detect a similar radiation 6 as specified in the previous example using the same auxiliary radiation 5. As may appear from FIGURE 5, the radiations 5 and 6 are supplied to the p-type part of the plate 30 while the n-type part 36 formed by the contact 31 and adjacent the p–n junction 35 is masked by the contact 31.

It will be evident that many combinations of semiconductor materials and capture centres can be found with which the effects desired for a device in accordance with the invention may be obtained.

A device according to the invention may itself include a radiation source 4 which emits the auxiliary radiation 5. The radiation source 4 is thus optically coupled to the photosensitive semiconductor body 1 (see FIGURE 1) and may advantageously be united therewith to form a structural combination. Thus the radiation source 4 and the photosensitive semiconductor body 1 may have a common envelope as indicated in broken line 7 in FIGURE 1, having a window 8 through which radiation 6 to be detected can reach the semiconductor body 1. The connecting terminals of the radiation source 4 are designated 9.

The radiation source 4 may be an arbitrary radiation source emitting the desired auxiliary radiation, for example, a tungsten-band lamp in combination with filters. Use may also advantageously be made of an injection-recombination radiation source comprising, for example, a zinc-activated p-type gallium phosphide body in which a p–n junction has been formed by alloying tin to the body. Such an injection-recombination radiation source emits auxiliary radiation 5 having a wavelength of approximately 5600 A. which radiation can produce free electrons and holes in the described gallium phosphide plates 20 and 30.

A device according to the invention may be used as an opto-electronic switching element, radiation 6 to be detected being emitted by a second radiation source 41 provided in the device (FIGURE 6).

This second radiation source 41 having connecting terminals 40 may advantageously constitute a structural combination with the photosensitive semiconductor body 1 and the auxiliary radiation source 4. Thus a common envelope 42 may be present.

Also, the radiation source 41 may be an arbitrary radiation source emitting the desired radiation 6, but alternatively an injection-recombination radiation source comprising, for example, a p-type semiconducter body of gallium phosphide activated with zinc and oxygen, in which a p–n junction has been formed by alloying tin to the body. Such an injection-recombination radiation source emits radiation having a wavelength of approximately 7000 A. which radiation may be detected by means of the described gallium phosphide plates 20 and 30. It is also possible to use an injection-recombination radiation source 41 having a semiconductor body of gallium arsenide. Such a radiation source can emit radiation having a wavelength of approximately 9100 A. which radiation may likewise be detected by means of the plates 20 and 30.

It will be evident that, if injection-recombination radiation sources are used, these radiation sources and the photo-sensitive semiconductor body can have a common semiconductor body.

It is to be noted that the frequency at which a photosensitive semiconductor body can detect optical signals is the higher according as the life of the generated charge carriers which add to the photo-electric current is shorter, whereas the sensitivity decreases as the life decreases. It is thus always necessary to have recourse to a compromise since high frequencies to be detected and a high sensitivity do not agree. In a device according to the invention a high sensitivity occurs due to the said superlinear increase in photo-electric current as a function of the intensity of the auxiliary radiation. Before this superlinear increase commences the life of the generated charge carriers is short, and after the superlinear increase it is much longer. However, this much longer life may still be very small. The present invention thus permits of finding a compromise of the above-mentioned kind which is much more favourable than is possible in known devices. The sensitivity of a device according to the invention depends not only upon the absolute life of the charge carriers, but rather upon the difference in life which may result from the superlinear increase.

It will be evident that the invention is not limited to the embodiments described in that to one skilled in the art many modifications are possible within the scope of the invention. Thus combinations of semiconductor materials and capture centres other than those described may be used. Further it is possible to detect radiation which can bring electrons from the level 12 of FIGURE 3 to the conduction band A or from the valence band C to the level 12. Also, for example, a further level may be present in the forbidden band B through which level charge carriers can reach the level 11 or 12.

What is claimed is:

1. A device for detecting radiation of a certain quantum energy comprising a photosensitive semiconductor body having valence and conduction bands separated by a forbidden band whose width exceeds the quantum energy of the radiation to be detected, output means connected across spaced regions of said body for determining photocurrents generated therein by radiation, means in at least a portion of said semiconductor body establishing capture centers producing at least a first energy level in the forbidden band capable of capturing free electrons and at least a second energy level in the forbidden band capable of capturing free holes, and means for irradiating the said portion of said semiconductor body with an auxiliary radiation of quantum energy larger than that of the radiation to be detected and capable of generating therein free electrons and free holes, the concentration of said capture centers and the intensity of said auxiliary radiation being such that the said capture centers of at least one of the first and second energy levels approach saturation and the device operates along a superlinear portion of its photocurrent-radiation intensity electrical characteristic wherein the photocurrent increase in the output means as a function of the incident radiation is sharper than quadratic, said body being positioned to receive the radiation to be detected which is capable of causing transitions to or from the first or second energy levels thereby modifying their population and by this means changing the photocurrent in the output means an amount indicative of the intensity of the received radiation to be detected.

2. The invention of claim 1 wherein the said portion of said body contains an overall concentration of active impurities such that it exhibits high resistivity and a Fermi-level located substantially between the said first and second energy levels.

3. The invention of claim 2 wherein the said portion of said body contains a p-n junction, one of the regions to which the output means is connected being on the n-type side of the junction, the other of the regions to which the output means is connected being on the p-type side of the junction.

4. The invention of claim 3 wherein the concentration of said capture centers is such that the capture centers producing the first energy level approach saturation before the other capture centers, and the said capture centers approaching saturation are located at least in the p-type side of the junction, and the body is positioned to receive the radiation to be detected at least on the p-type side of the junction.

5. The invention of claim 4 wherein the body is of gallium phosphide doped with copper.

6. The invention of claim 3 wherein the concentration of said capture centers is such that the capture centers producing the second energy level approach saturation before the other capture centers, and the said capture centers approach saturation are located at least in the n-type side of the junction, and the body is positioned to receive the radiation to be detected at least on the n-type side of the junction.

7. A device for detecting radiation of a certain quantum energy comprising a photosensitive semiconductor body having valence and conduction bands separated by a forbidden band whose width exceeds the quantum energy of the radiation to be detected, output means connected across spaced regions of said body for determining photocurrents generated therein by radiation, means in at least a portion of said semiconductor body establishing capture centers producing at least a first energy level in the forbidden band capable of capturing free electrons and at least a second energy level in the forbidden band capable of capturing free holes, said semiconductor portion having a high resistivity, and means for irradiating the said portion of said semiconductor body with an auxiliary radiation of quantum energy at least equal to the forbidden band width and capable of generating therein free electrons and free holes, the concentration of said capture centers and the intensity of said auxiliary radiation being such that the said capture centers producing the first energy level approach saturation before the other capture centers and the device operates along a superlinear portion of its photocurrent-radiation intensity electrical characteristic wherein the photocurrent increase in the output means as a function of the incident radiation is sharper than quadratic, said body being positioned to receive the radiation to be detected which is capable of causing electron transitions to or from the first or second energy levels thereby modifying their population and by this means changing the photocurrent in the output means an amount indicative of the intensity of the received radiation to be detected.

8. The invention of claim 7 wherein the received radiation to be detected has a quantum energy capable of causing transitions from the valence band to the second energy levels thereby reducing the photocurrent in the output means.

9. The invention of claim 7 wherein the received radiation to be detected has a quantum energy capable of causing transitions from the first energy levels to the conduction band thereby increasing the photocurrent in the output means.

10. device for detecting radiation of a certain quantum energy comprising a photosensitive semiconductor body having valence and conduction bands separated by a forbidden band whose width exceeds the quantum energy of the radiation to be detected, output means connected across spaced regions of said body for determining photocurrents generated therein by radiation, means in at least a portion of said semiconductor body establishing capture centers producing at least a first energy level in the forbidden band capable of capturing free electrons and at least a second energy level in the forbidden band capable of capturing free holes, said semiconductor portion having a high resistivity, and means for irradiating the said portion of said semiconductor body with an auxiliary radiation of quantum energy at least equal to the forbidden band width and capable of generating therein free electrons and free holes, the concentration of said capture centers and the intensity of said auxiliary radiation being such that the said capture centers producing the second energy level approach saturation before the other capture centers and the device operates along a superlinear portion of its photocurrent-radiation intensity electrical characteristic wherein the photocurrent increase in the output means as a function of the incident radiation is sharper than quadratic, said body being positioned to receive the radiation to be detected which is capable of causing electron transitions to or from the first or second energy levels thereby modifying their population and by this means changing the photocurrent in the output means an amount indicative of the intensity of the received radiation to be detected.

11. The invention of claim 10 wherein the received radiation to be detected has a quantum energy capable of causing transitions from the first energy levels to the conduction band thereby reducing the photocurrent in the output means.

12. The invention of claim 10 wherein the received radiation to be detected has a quantum energy capable of causing transitions from the valence band to the second energy levels thereby increasing the photocurrent in the output means.

13. The invention of claim 1 wherein the auxiliary radiation means is united with the semiconductive body to form an integral unit.

14. The invention of claim 13 wherein the radiation to be detected emanates from a source united with the semicondutive body to form an integral unit.

(References on following page)

References Cited

UNITED STATES PATENTS

| | | | |
|---|---|---|---|
| 2,706,790 | 4/1955 | Jacobs | 250—83.3 |
| 3,043,958 | 7/1962 | Diemer | 250—211 |
| 3,092,725 | 6/1963 | Grimmeiss et al. | 250—212 |
| 3,217,169 | 11/1965 | Grimmeiss et al. | 250—217 |

JAMES W. LAWRENCE, Primary Examiner

RAYMOND F. HOSSFELD, Assistant Examiner

U.S. Cl. X.R.

136—89; 317—235

PO-1050
(5/69)

UNITED STATES PATENT OFFICE
CERTIFICATE OF CORRECTION

Patent No. 3470379      Dated September 30, 1969

Inventor(s) H. G. GRIMMEISS ET AL

It is certified that error appears in the above-identified patent and that said Letters Patent are hereby corrected as shown below:

Col. 3, line 15, "obtaining" read --obtaining the--;

Col. 10, line 21, "out in vacuo" read --out in vacuo at a--;

Col. 13, line 58, "approach" read --approaching--.

Signed and sealed this 28th day of July, 1970.

(SEAL)
Attest:

Edward M. Fletcher, Jr.
Attesting Officer

WILLIAM E. SCHUYLER, JR.
Commissioner of Patents